United States Patent [19]

Riedl

[11] Patent Number: 4,516,901

[45] Date of Patent: May 14, 1985

[54] MOVABLE LIFTING AND DEPOSITING DEVICE FOR PORTABLE CONTAINERS, E.G., CABINS, CONTAINERS, SHELTERS OR THE LIKE

[75] Inventor: Reinhold Riedl, Gensingen, Fed. Rep. of Germany

[73] Assignee: Haacon hebetechnik GmbH, Fed. Rep. of Germany

[21] Appl. No.: 513,522

[22] Filed: Jul. 13, 1983

[30] Foreign Application Priority Data

Jul. 17, 1978 [DE] Fed. Rep. of Germany ....... 3226882

[51] Int. Cl.[3] ............................................. B60P 1/12

[52] U.S. Cl. ................................ 414/458; 254/6 R; 280/43.21

[58] Field of Search ...................... 414/458, 459, 498; 280/43.21; 254/6 R, 6 B, 6 C, 45, 95, 96, 97

[56] References Cited

U.S. PATENT DOCUMENTS 3,887,209 6/1975 Blanc ............................ 414/458 X 4,147,267 4/1979 Mai .................................... 414/498

*Primary Examiner*—Robert G. Sheridan

*Attorney, Agent, or Firm*—Jacobi, Siegel, Presta, Marzullo & Aronson

[57] ABSTRACT

A movable lifting and depositing device comprising separate rack and pinion jacks to be connected to the corners of portable containers, e.g., cabins, containers, shelters or the like, by means of brackets, the jacks having racks for the containers provided on columns which have track wheels at the bottom. In order to maintain sufficient stability of the lifting and depositing device, even when the container to be handled is at relatively high positions, each rack and pinion jack has a swivel mechanism with two vertically spaced work positions. In its bottom work position, wherein it is folded down from a main column guide onto a relevant bracket, the swivel mechanism is to be connected with an auxiliary column guide arranged beneath the main column guide. This can be moved by the swivel mechanism into the top work position of the associated column. To move the swivel mechanism into one of the two work positions when it is loaded, a stop device is provided between the main column guide and the associated rack or column.

10 Claims, 8 Drawing Figures

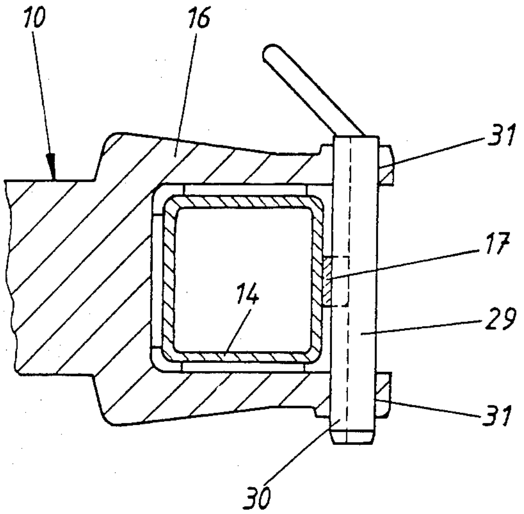
FIG.3
FIG.4
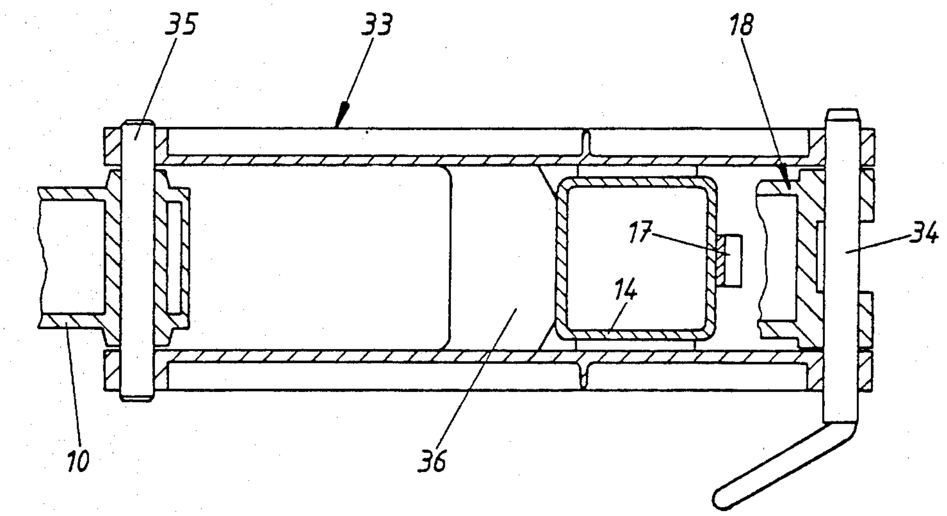

MOVABLE LIFTING AND DEPOSITING DEVICE FOR PORTABLE CONTAINERS, E.G., CABINS, CONTAINERS, SHELTERS OR THE LIKE

BACKGROUND OF THE INVENTION

The invention relates to a movable lifting and depositing device for portable containers, e.g., cabins, containers, shelters or the like, with rack and pinion jacks to be connected to the corners of the containers by means of brackets, and of which the racks are provided on columns which have track wheels, and which can be raised for depositing the container, e.g., on the ground, or for lifting it from the ground by the rack and pinion jacks to the level of the base of the container.

To handle such portable containers, particularly for loading and unloading of the same into and out of transport aircraft, either expensive crane trucks or loadable, relatively bulky special vehicles with lifting mechanisms have been used, which likewise are expensive and require much storage space themselves.

Suitable lifting and depositing devices of the type described and for the aforementioned purposes can require less storage space, so that they can be simply left without further problems after a container is loaded. These lifting and depositing devices, however, have the drawback that the jack mechanisms, including the column or support guides, are attached relatively high on the brackets, so that when a container is lifted to a relatively high position or is lifted out of such a high position (which, e.g., can be defined by the loading surface of a cargo truck), quite a length of the columns beneath the jacks is freed, i.e., not supported, which leads to instability of the device and to a correspondingly great unsupported length of the columns which may buckle. Also, the manual cranks of the jacks are complicated to operate in such cases because of their high position. On the other hand, with these known lifting and depositing devices, the rack and pinion jacks including the support or column guides cannot be arranged lower on the brackets, because the track wheels mounted on the bottom ends of the columns, e.g., for placement of the container on the ground or for lifting it to the level of the base of the container, must allow lifting of the wheels, which requires a corresponding free space beneath the jacks and column guides to receive the track wheels.

SUMMARY OF THE INVENTION

The object of the invention is to avoid the above imperfection and to develop a lifting and depositing device of the aforementioned construction, with space-saving structure and retaining all of the advantages of prior constructions, so that, even when the containers being handled are in relatively high positions, their columns (support columns) have satisfactory guides. At the same time, the manual operation of the rack and pinion jacks will also be simplified.

This is provided according to the invention in that:

(a) each rack and pinion jack has a swivel mechanism with two vertically spaced work positions, (b) the swivel mechanism in its bottom work position, folded down from a main support or column guide onto the associated bracket, is to be connected with an associated auxiliary column guide, and can be removed from the associated guide by the swivel mechanism found in the top work position, and (c) a stop means is provided for swiveling the mechanism into one of the two positions while it is loaded, between the main column guide and the associated rack or column.

In their bottom work positions, the swivel mechanisms in connection with the associated auxiliary column guides stabilize the columns in the area beneath the main column guides and at the same time the manual cranks of the jack gears can advantageously be handled and operated more conveniently. With the lifting and depositing device according to the present invention, therefore, containers can be deposited on, e.g., loading surfaces of cargo trucks even at greater heights, and can also be removed therefrom. When the swivel mechanisms are folded up and removed, and the auxiliary column guides are drawn back, the columns advantageously can be raised so that their track wheels align with the container bottoms, which is of importance if a container is to be deposited on the ground or on a loading surface, e.g., in a transport aircraft, or is to be raised from there.

So that the lifting and depositing device can be swiveled into one of the two work positions even when it is loaded, a stop means is provided between each main column guide and the associated rack or column. The stop means can, e.g., comprise a plug element with teeth, which engages in the teeth of the rack. The lifting and depositing device can be embodied to be even more space-saving (i.e., can be configured of relatively smooth alignment), so that the device needs less storage space and consequently can also remain in the container stored in a transport aircraft. At the destination, then, these containers can be unloaded in the shortest time and, e.g., can be loaded onto cargo trucks. If that is done, the brackets including the rack and pinion jacks and support columns can be removed from the container corners and can be stored separately.

In accordance with one embodiment of the invention, with folded down swivel mechanisms, the attached auxiliary support guide is at a relatively larger distance from the main support guide.

The construction of the invention insures a dependable engagement of the driving pinion into the associated rack in any work position of the swivel mechanism.

Another advantage of the invention is that, for the purpose of complete lifting of a support with track wheel and to provide the required space for the track wheel after the folding up of the swivel mechanism, only the auxiliary support guide (column guide) needs to swivel against the bracket or in the direction of the container. In this disengaged space-saving position, the auxiliary column guide can be stopped with customary detachable means.

The construction of the present invention simplifies the connection and release of the connection between the auxiliary column guide and swivel mechanism, and the forked free end of the auxiliary support guide, with the exception that the support at the same time advantageously also carries the swivel mechanism partially fitted in.

Further embodiments of the invention advantageously include a side reinforcement of the auxiliary support column guide and the folded down swivel mechanism, and thereby further improve the stability of the stability of the supports beneath the main support column guide.

Another embodiment provides the advantage that a dependable guide of the support column is attained even with a relatively low main support column guide, when the track wheels are raised.

BRIEF DESCRIPTION OF THE DRAWINGS

The invention is clarified relative to the drawings of exemplary embodiments.

They show:

FIG. 3 is a partial cross section taken substantially along line A—A of FIG. 2;

FIG. 4 is another partial cross section taken substantially along line B—B of FIG. 2;

DESCRIPTION OF THE PREFERRED EMBODIMENTS

Figure 1:
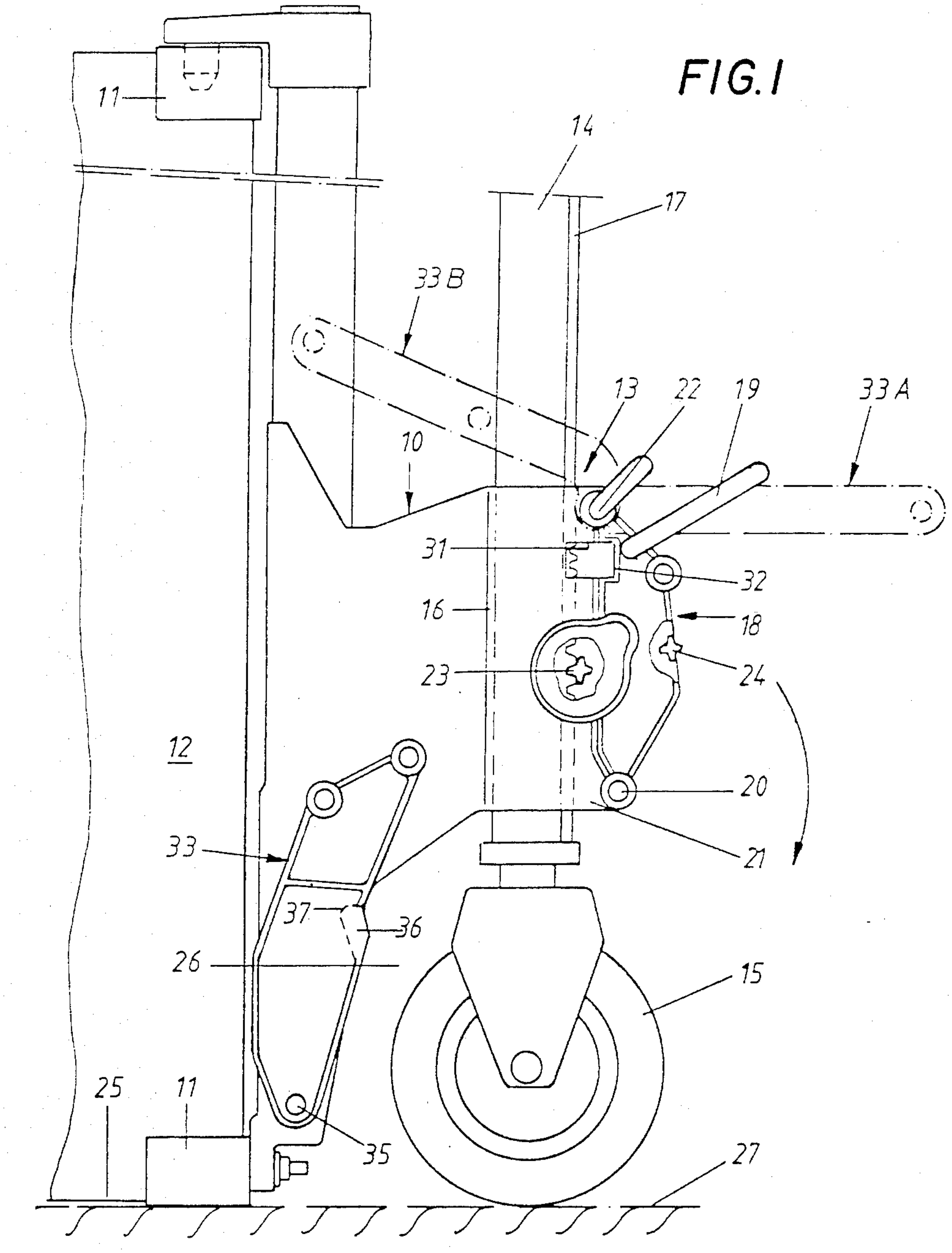
FIG. 1 is a side elevational view of a part of the lifting and depositing device according to the invention with a rack and pinion jack connected to a container corner with folded up swivel mechanism and completely raised support column, as well as with the container resting on the ground, of which only a part is shown.

The lifting and depositing device is intended for rectangular containers 12 which, e.g., are to be loaded on or off cargo trucks over loading ramps into transport aircraft. In order to be able to move the containers even into the freight space of the aircraft, when no rollers are present on the ground of the freight room, the lifting and depositing devices generally must remain on the containers, which requires a space-saving construction of the same as well as the raising of the track wheels to the level of the container bottom (for the depositing procedure).

The lifting and depositing device of the present invention for this reason has four separate brackets 10, which can be detachably connected on the customary corner fitting 11 of containers 12 in a known manner. Each bracket 10 supports a rack and pinion jack 13, by means of which each column 14 separately can be moved vertically relative to container 12. At the bottom end of each column 14, a track wheel 15 is rotatable around the longitudinal axis of column 14. Since all four brackets 10, rack and pinion jacks 13 and columns 14 of a lifting and depositing device are identical, the arrangement of only one container corner will be described hereinafter.

On the outside vertical edge of bracket 10 is a main column guide 16 for colum 14, comprising, e.g., a rectangular tube. On the outside of column 14 is fastened the rack 17 of rack and pinion jack 13. Rack and pinion jack 13 includes a swivel mechanism 18, which can be operated by a manual crank 19, and has two vertically spaced work positions, one of which is shown in FIG. 1 and the other in FIG. 2. Swivel mechanism 18 for this purpose is mounted rotatably in the direction of the arrow around a detachable axis 20, which is fastened in projecting parts 21 of the main column guide 16 with U-shaped transverse cross section.

In FIG. 1, swivel mechanism 18 is shown in its top work position, in which it is fixed by a cotter pin 22 on main column guide 16. Swivel mechanism 18 on its facing sides is provided with driving pinions 23 and 24. When swivel mechanism 18 is in the top work position shown in FIG. 1, driving pinion 23 is in contact with rack 17. When swivel mechanism 18 is entirely in the top work position (FIG. 1), with suitable operation of the manual crank 19, it is possible to raise all four columns 14 by driving pinion 23 and rack 17 so far into the main column guides 16 that track wheels 15 completely take up the free space 26 beneath the brackets 10, and their lowest part aligns with the container bottom 25, thereby enabling the container 12 to be lifted or deposited from or onto the loading surface 27 of an aircraft. Each two adjacent rack and pinion jacks 13 can be connected by a spindle in a drive configuration, so that only two manual cranks 19 need be turned.

When container 12 is to be loaded or unloaded, it is lifted by operation of manual cranks 19 working the lifting and depositing device, whereby the four columns 14 are moved downward relative to container 12 and support the containers. When it is raised, the container 12 can be moved over a loading ramp out of the fuselage of a transport aircraft. At this point, it is to be noted that all of the swivel mechanisms 18 are of a suitable, known construction which is self-locking under a load.

Figure 2:
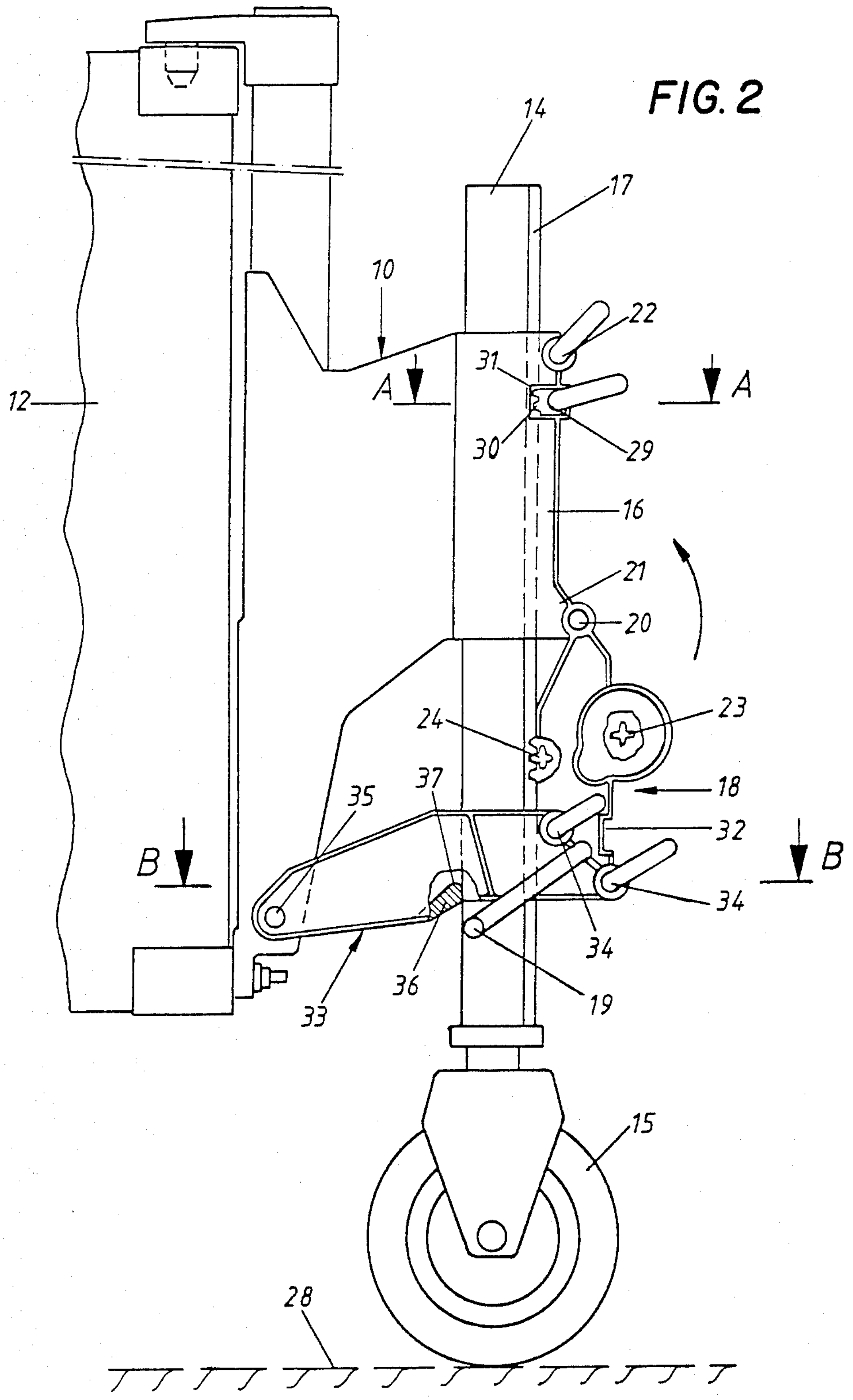
FIG. 2 is a side elevational view similar to FIG. 1, in which the swivel mechanism is shown in a folded down work position, connected with the auxiliary support column guide, and with a raised container.

If container 12 is to be lifted further in relation to ground 28 (FIG. 2) after this unloading procedure, e.g., for loading on a cargo truck, all of the loaded swivel mechanisms 18 are brought into their bottom work position, shown in FIG. 2. In order to facilitate this, before loosening cotter pins 22 and moving swiveling mechanisms 18 downwardly, stop means 29 are to be inserted between each main column guide 16 and racks 17 or columns 14, in order to temporarily hold the columns in the main column guides 16. When swivel mechanisms 18 are no longer held in their bottom work positions, and driving pinions 24 instead of driving pinions 23 engage in their associated racks 17, the stop means 29 are again removed, so that columns 14 can be moved further downwardly by operation of manual cranks 19, moving rack and pinion jacks 13, in order to lift the container 12 further to the desired level.

Each stop means 29 (FIG. 2) comprises a rod with teeth 30, which can be brought into engagement with rack 17, and thus stop means 29, fitting sideways through corresponding cutouts 31, sticks through into both cheeks of the main column guide 16 (FIG. 3). Each swivel mechanism 18 housing is provided with a cutout 32, and when the mechanism 18 is swiveled up into the work position shown in FIG. 1, it meshes with the stop means 29.

An auxiliary column guide 33 is provided on the one hand to securely fix swivel mechanism 18 in their bottom work positions and, on the other hand, to stabilize the relatively long sections of columns 14 beneath the main column guides 16. Thus, the swivel mechanism 18 can be detachably connected in its bottom work position, e.g., by cotter pins 34. Each auxiliary column guide 33 has a separate arm which is mounted rotatably by means of a bolt 35 on the bottom end of bracket 10, which has a forked free end to receive and guide the relevant column 14 and also to securely hold an edge section of the associated swivel mechanism 18 (FIG. 4). In the exemplary embodiment, swivel mechanism 18 is detachably connected by two cotter pins 34 with both cheeks of the auxiliary column guide 33 (FIG. 2).

When the auxiliary column guide 33 is in its work position shown in FIG. 2, column 14 is reliably guided sideways as well as against bracket 10 by a rib 36 with a rounded edge 37. Column 14 is guided forwardly by the swivel mechanism 18.

When container 12 is to be removed from the raised position shown in FIG. 2, e.g., to be deposited on the ground 28, columns 14 are moved upwardly by suitable rotation of the manual cranks 19 in the main and auxiliary column guides 16 and 33, until the bottom ends of column 14 and the bearings of track wheels 15 come near the auxiliary column guides 33. Then the stop means 29 are positioned in the aforementioned manner between each rack 17 and main column guide 16. Finally, after loosening cotter pins 34, the swivel mechanisms 18 can be folded into their top work position (FIG. 1) and can be connected tightly by cotter pins 22 with main column guides 16 or brackets 10. At the same time, auxiliary column guides 33 are swiveled against brackets 10 and brought into rest positions as shown in FIG. 1, in which they can be fixed by suitable stop means (not shown). Track wheels 15 can then be moved a certain distance in the free space 26 beneath the brackets 10, so that they are again aligned at the bottom as in FIG. 1 with the container bottom 25. The container 12 is thus deposited on the ground.

Alternatively, the auxiliary column guide 33A (FIG. 1) can also be connected rigidly or can be articulated in the top area on swivel mechanism 18. When swivel mechanism 18 is swiveled downwardly, column 14 is encircled from the side and guided with a cotter pin (not shown) forward and parallel to the surface of column 14 which lies opposite rack 17, and is also connected detachably with bracket 10 by cotter pins (not shown). When auxiliary column guide 33B is articulated thereon and swiveled vertically to the bracket 10, and detachably affixed to the top of the bracket 10, auxiliary column guide 33B, with mechanism 18 in the top position (FIG. 1), can also undertake a "top" guide of column 14 and stabilization of the main column guide 16. This is important if the main column guide 16 is relatively short and the track wheels are raised.

Figure 5:
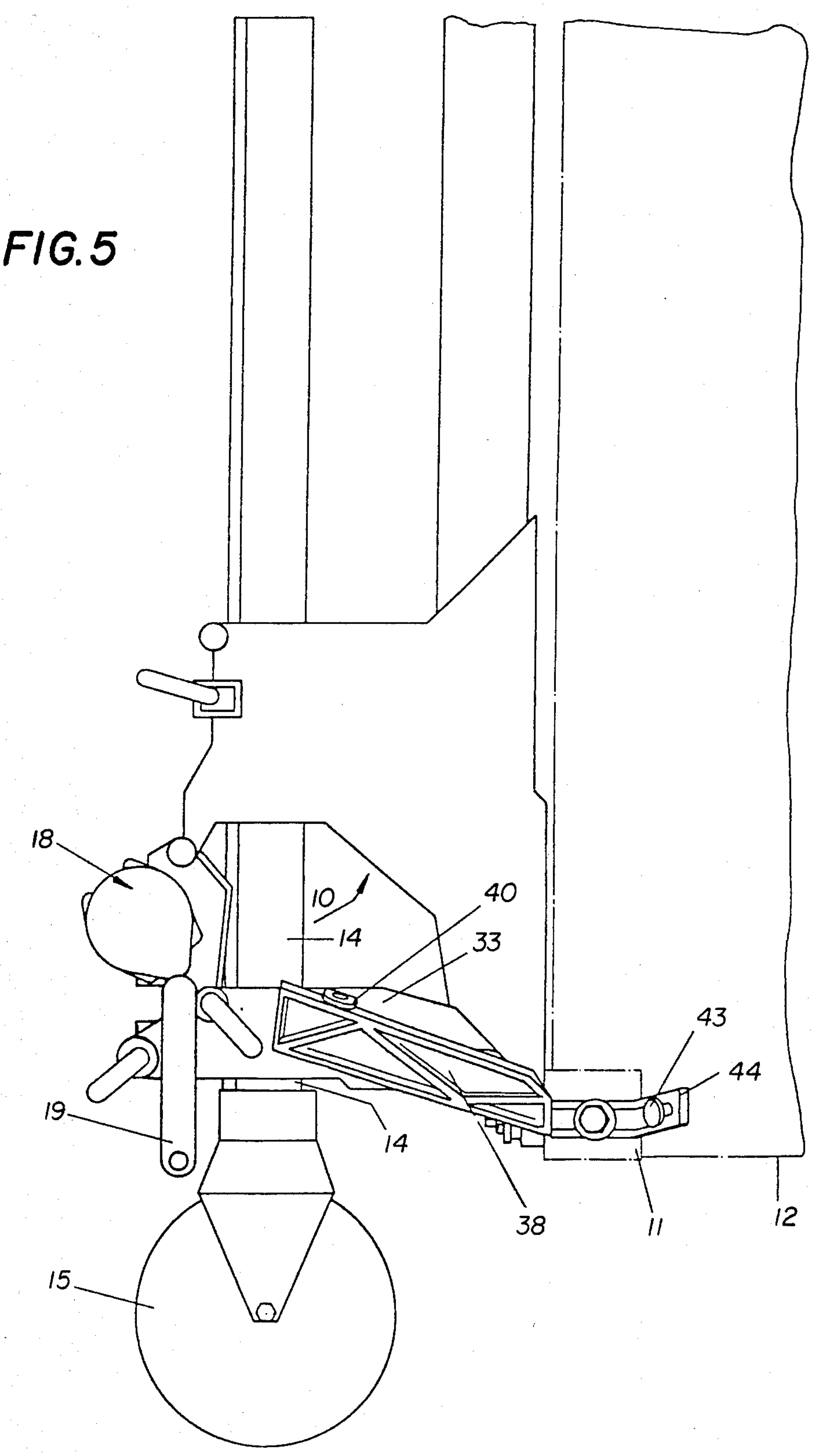
FIG. 5 is a side elevational view similar to FIG. 2, in which the auxiliary support column guide is reinforced by side spring arms.
Figure 6:
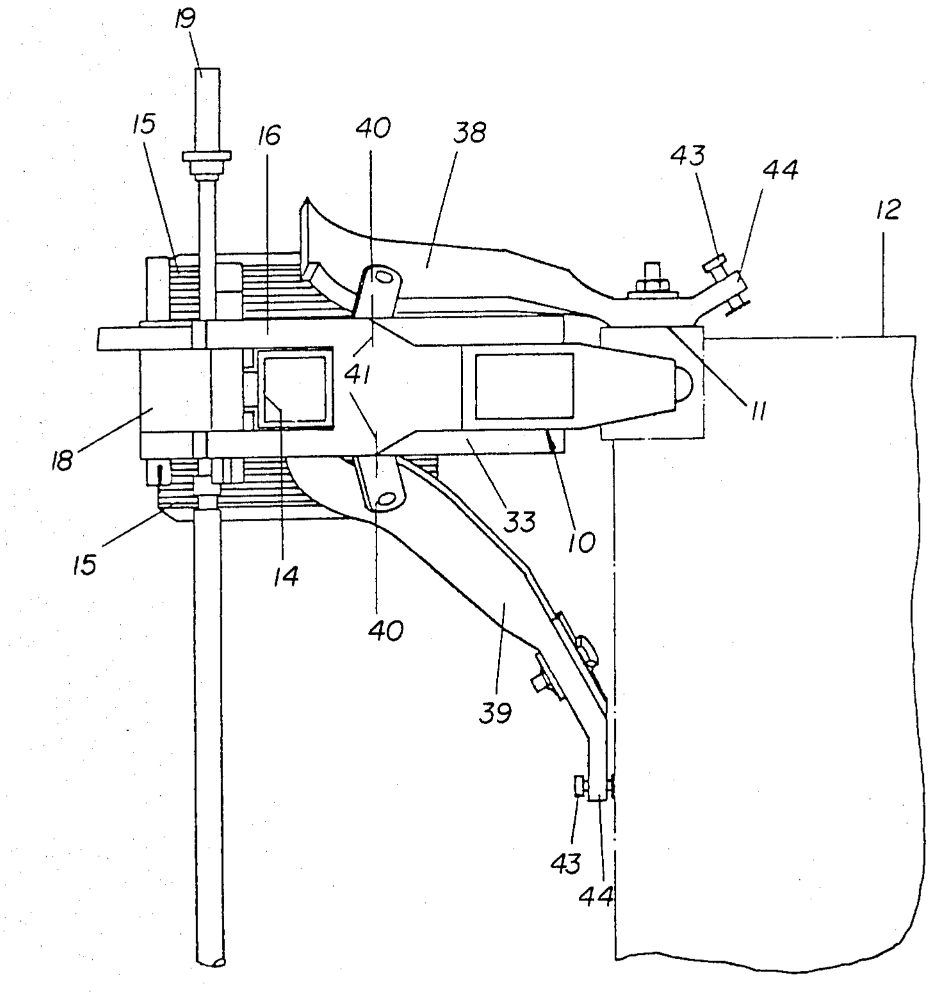
FIG. 6 is a plan view of the arrangement shown in FIG. 5.

FIGS. 5 and 6 show a variation of the present invention in which auxiliary column guide 33 is held in its work position from the side by spring arms 38, 39. Arms 38, 39 rotate on parts 40, which in turn rotate on both sides of the auxiliary column guide 33 around the axis 41. Arms 38, 39 are thus mounted "Cardanically".

In the exemplary embodiment of FIGS. 5 and 6, the twin track wheels 15 on the bottom end of each column 14 are arranged before both the front and the back of container 12. Brackets 10 with the main column guide 16 as well as auxiliary column guides 33 can also be so angled inwardly or beveled that in plan view the track wheels 15 are positioned further inside in reference to FIG. 6, which in the case of a given movement, can be important in the freight space, e.g., of an aircraft.

In FIGS. 5 and 6, spring arm 38 is screwed into the bottom corner fitting 11 of container 12, while arm 39 abuts with an adjustable thumbscrew 43 on the one surface of container 12 near to its bottom connected border. Arms 38, 39 are identical and carry the thumbscrews 43 on beveled end 44.

Figure 7:
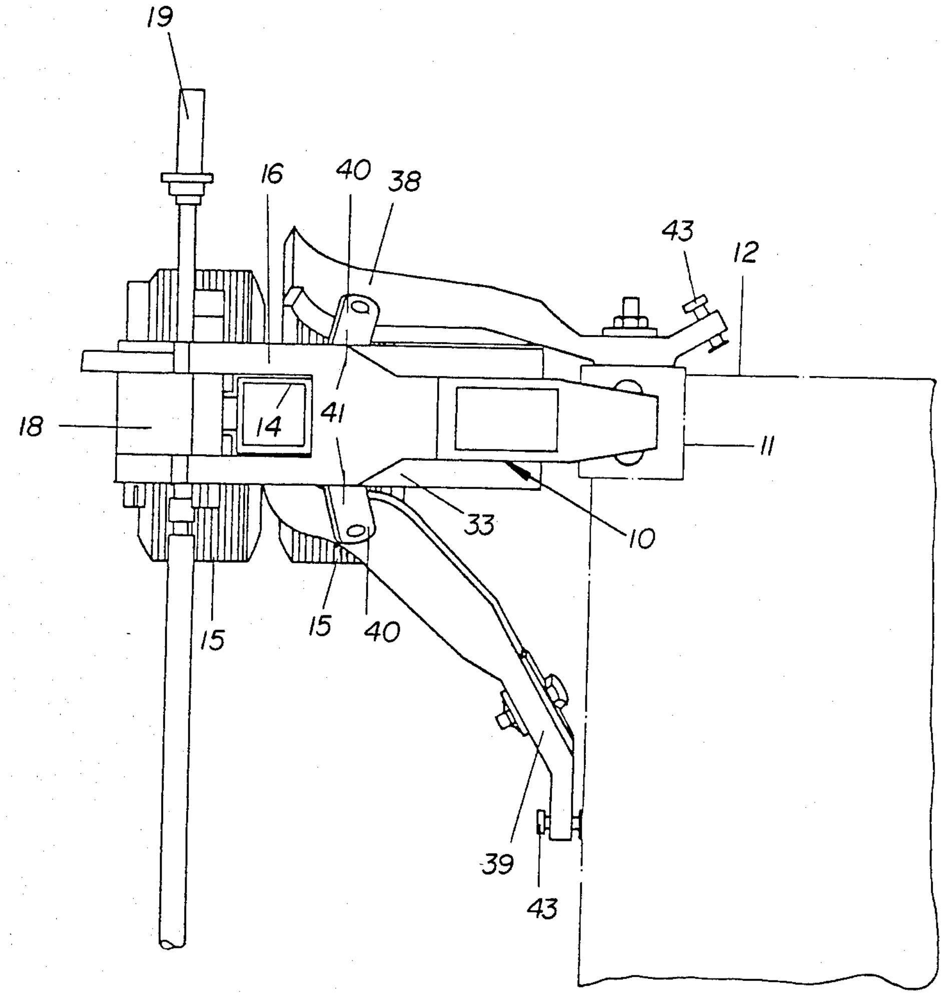
FIG. 7 is a plan view of a modified arrangement of the device of FIG. 5, on a container corner.

In FIG. 7, brackets 10 are so arranged that twin track wheels 15 are positioned on the side adjacent to a side wall of container 12. Also, in this case, the one spring arm 38 is screwed into the bottom corner fitting 11 of container 12, while the other arm 39 engages with its thumbscrew 43 on the bottom connected border of the side wall of container 12.

Figure 8:
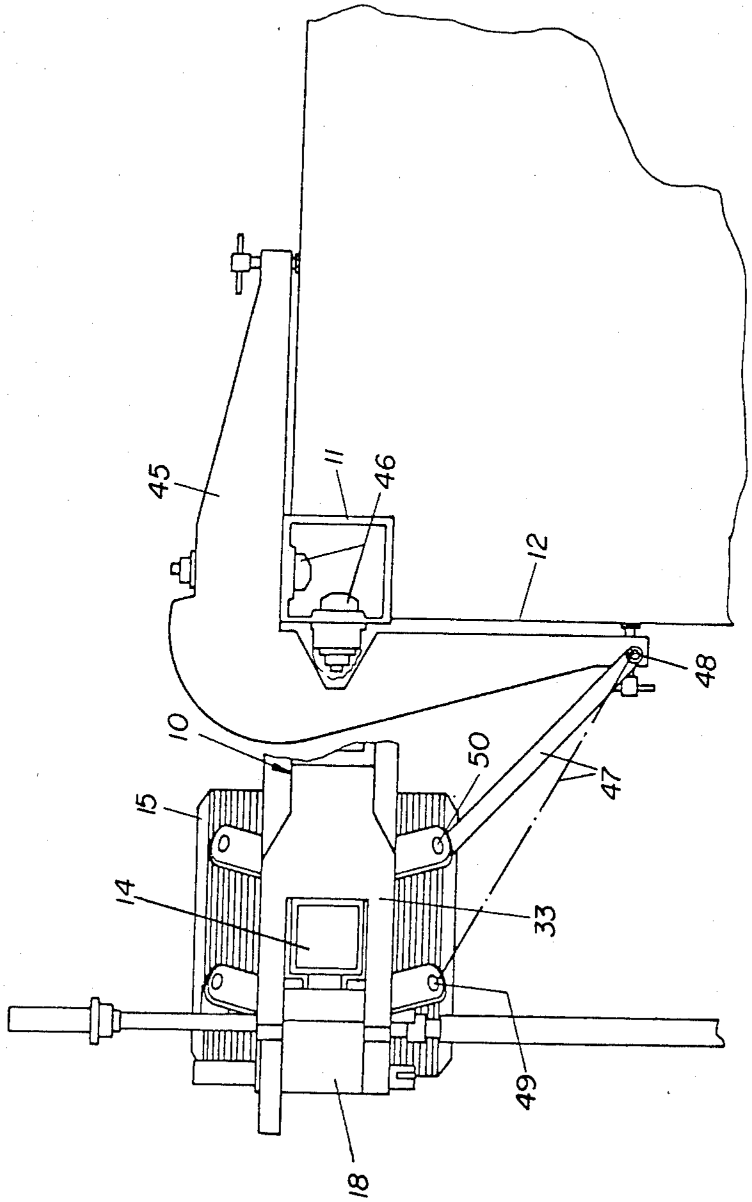
FIG. 8 is a plan view of a container corner with a modified side reinforcement of the auxiliary support or column guide.

In the FIG. 8 embodiment, each corner of container 12 in the area of the bottom corner fitting 11 is bordered by an angular stabilizing part 45, which is connected by screws 46 to the bottom corner fitting 11. Auxiliary column guide 33, in this case, is connected by struts 47 with the stabilizing part 45. Struts 47 can rotate on stabilizing part 45 at 48, 49 and 50, and are connected to the auxiliary column guide 33.

What I claim is:

1. A movable lifting and depositing device for portable containers, e.g., cabins, containers, shelters or the like, with rack and pinion jacks connected by means of brackets to the corners of the containers, the jacks having racks for the containers which are provided on movable columns having track wheels, the columns being raised for depositing of the container, e.g., on the ground, or for lifting of the wheels by the rack and pinion jacks to the level of the container bottom, characterized in that:

(a) each rack and pinion jack (13) has a swivel mechanism (18) with two vertically spaced work positions;

(b) the swivel mechanism (18) in its bottom work position, being folded down from a main column guide (16) onto the associated bracket (10), for connection with an auxiliary column guide (33) arranged beneath the main column guide (16), which can be removed when the swivel mechanism (18) of the associated column support (14) is in the top work position; and (c) stop means (29) between the main column guide (16) and the associated rack (17) and column (14) to enable movement of the swivel mechanism (18) into one of said two work positions when the lifting and depositing device is loaded.

2. The device as in claim 1, characterized in that the swivel mechanism (18) is mounted at the bottom end of main column guide (16) near its outside edge.

3. The device as in claim 1 or 2, characterized in that the two work positions of the swivel mechanism (18) are offset from each other at an angle of substantially 180°.

4. The device as in claim 1 or 2, characterized in that swivel mechanism (18) has driving pinions (23, 24) on facing sides which, according to the work position of the swivel mechanism (18), are alternately in engagement with the rack (17) of the associated column (14).

5. The device as in claim 1, characterized in that an auxiliary column guide (33) is mounted to swivel on the bottom end of the associated bracket (10), which also supports the main column guide (16).

6. The device as in claim 5, characterized in that the auxiliary column guide (33) has an arm with a forked free end, into which the relevant column (14) is guided, and connecting means (34) are provided to connect the swivel mechanism (18) with the free end of the column guide arm.

7. The device as in claim 1, characterized in that an auxiliary column guide (33A) is connected to the swivel mechanism (18), and means are provided to connect detachably the auxiliary column guide with the associated bracket (10).

8. The device as in claim 6, characterized in that on the side of each auxiliary column guide (33) are mounted spring arms (38, 39), which, when auxiliary column guide (33) is in the work position, are connected in contact with the container (12).

9. The device as in claim 6, characterized in that each auxiliary column guide (33) when in its work position is connected by at least one strut (47) with a stabilizing part (45) angularly surrounding the container corner.

10. The device as in claim 7, characterized in that the auxiliary column guide (33B) is mounted to swivel at the top end of the associated bracket (10), whereby when swivel mechanism (18) is folded up by connection with the bracket (10), it can serve as guide for column (14) and can stabilize the main column guide.

* * * * *